March 31, 1964 C. W. SPURLOCK 3,127,257

DESICCANT CARTRIDGE

Filed Sept. 30, 1960

INVENTOR:

Charles W. Spurlock

3,127,257
DESICCANT CARTRIDGE
Charles W. Spurlock, 16901 Minnehaha St.,
Granada Hills, Los Angeles, Calif.
Filed Sept. 30, 1960, Ser. No. 59,703
3 Claims. (Cl. 55—309)

My invention relates generally to the purification of air and other gases through the phenomenon of adsorption and pertains more particularly to a renewable or throwaway type of desiccant cartridge and to methods and means for installing and sealing the cartridge in a gas purification system.

The usual practice in this art is to provide a permanent pressure resistant system or container having a gas inlet, a gas outlet and seals. Within this container or system there is inserted a moisture tight, less costly, relatively low pressure container, of the common "tin-can" variety, containing an activated desiccant. Either manually, or automatically by the act of moving end closures into place, the can is perforated or otherwise opened for the flow of gas through the contained desiccant.

The seals which are provided in the permanent container are intended to seal leakage passages so that all gas to be desiccated and purified is compelled to flow through the desiccant and none should bypass around the desiccant can.

More recent technological advances in the use of purified gases and in the use of highly compressed air requires desiccation and purification down to less than one part per million of water vapor, carbon dioxide, oil vapor, etc. Since some gases commonly required to be purified may originally contain contaminants amounting to as much as one thousand parts per million, it is obvious that leakage or bypassing to the extent of as little as one tenth of one percent may defeat the purpose of the desiccator.

One feature of this invention is directed to the purification of high pressure air for use in cryogenic systems where any air, unexpectely bypassing the desiccant cartridge, may carry over enough water vapor, carbon dioxide, or the like, to suddenly freeze a cryogenic device and result in its malfunction even to the extent of losing a valuable missile.

It is the primary object of the invention, in connection with replaceable desiccant cartridges to provide seals which are relatively foolproof and yet will well insure against bypassing, while any tendency for leakage or bypassing will give audible or otherwise detectable warnings.

Specifically it is an object of the invention to provide seals so arranged that if it is at any time possible for impure gas or air to bypass the seals, this bypassing air or gas will be wasted to the atmosphere rather than be allowed to proceed to damage some delicate or expensive apparatus.

Desiccators and dehydrators employing renewable desiccant cartridges are extensively used by the Armed Forces of the United States and it is an object of this invention to generally improve the efficiency and dependability of these desiccators and dehydrators particularly in connection with those installations where even momentary bypassing of a small amount of contaminants may have immediate and disastrous results.

Still other objects and advantages will appear in the following description of one specific and typical embodiment of my invention.

In carrying out this invention in a preferred embodiment, I am enabled to do away with the usual automatic can perforators and there is no guess work about providing proper openings and proper sealing, the invention having been developed to meet conditions where it may not be feasible to exercise the skill and deliberation now required with existing desiccators of the class described.

One practical embodiment of my invention is illustrated and described by the accompanying drawings and in this specification, although my invention is of a broader nature as shown by the appended claims.

Figure 1:
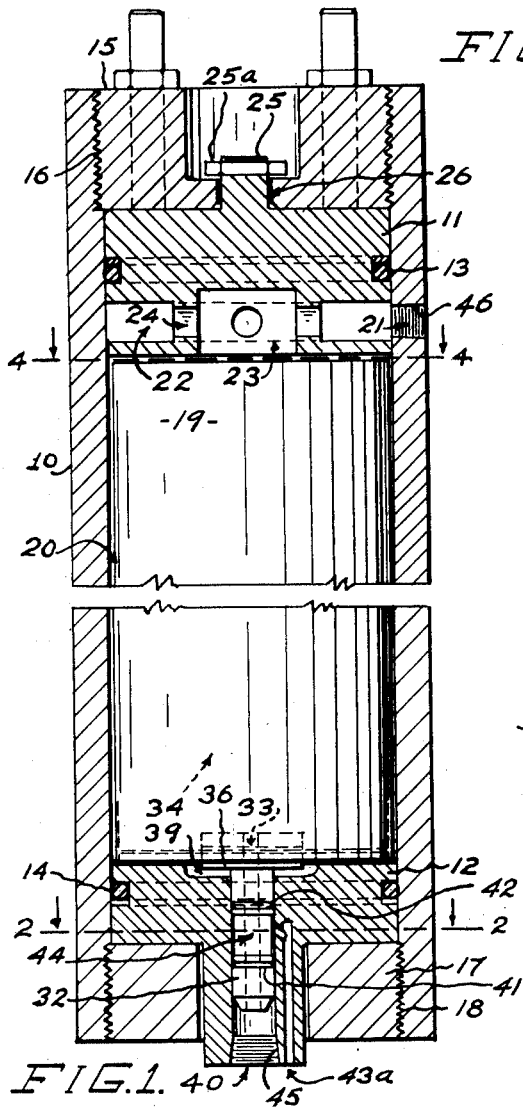
FIGURE 1 is a vertical sectional view of a desiccant cartridge in functional position in a cylinder forming a part of a pressurized purification system for air or other gas.

Referring to the drawings and the numerals designating respective parts, the numeral 10 indicates a tubular cylinder into which is fitted an upper closure 11 and a lower closure 12. Each closure is a reasonably close sliding fit in the cylinder and each is provided with a conventional O-ring seal; the upper seal indicated by the numeral 13 and the lower seal being indicated by the numeral 14. The upper closure is held in place, against relatively high pressure if required, by a retainer ring 15 screw threaded into the corresponding end of the cylinder at 16, while the lower closure is held in place by a retainer ring 17 screw threaded into the lower end of the cylinder as at 18.

The invention provides that the lower closure 12 may be relatively fixed in that there is no occasion to remove same unless the O-ring 14 requires replacement, while the upper closure is readily removed for removal of a used desiccant cartridge and installation of a new desiccant cartridge, such cartridge being designated in the drawings by the numeral 19.

The cylinder 10 and the closures 11 and 12 serve to provide and enclose a pressure chamber, indicated at 20, which by reason of the design is suited for holding compressed air or gases at pressures as high as several thousand pounds per square inch; it being known that the higher the pressure the greater the degree to which air or other gas may be desiccated and purified at any given temperature by any given desiccator.

In the wall of cylinder 10 there is provided an outlet port 21 leading from chamber 20 at a point above the upper end of the desiccant cartridge, since this cartridge offers only slight clearance between it and the cylinder wall.

The normal position of the upper closure 11 is just slightly above the desiccant cartridge and accordingly this closure is provided with an annular groove 22 registering at all times with the outlet port 21. A socket 23 is machined in the bottom of the upper closure 11 and a plurality of holes 24 connect this socket with the annular groove 22. To facilitate removal of the upper closure 11 for the replacement of a cartridge 19, the closure is provided with a stem 25 projecting up thru a bore 26 in the retainer 15 and is provided with a nut 25a which acts to pull the closure 11 as the retainer is unscrewed out of the cylinder.

Figure 3:
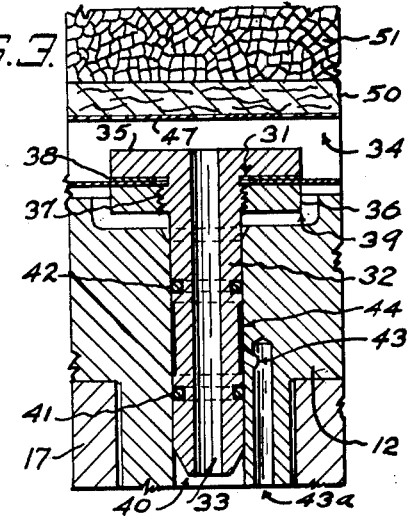
FIGURE 3 is a fragmentary vertical section of the lower end of the assembly shown in FIGURE 1; this FIGURE 3 being on a larger scale than the other figures.
Figure 4:
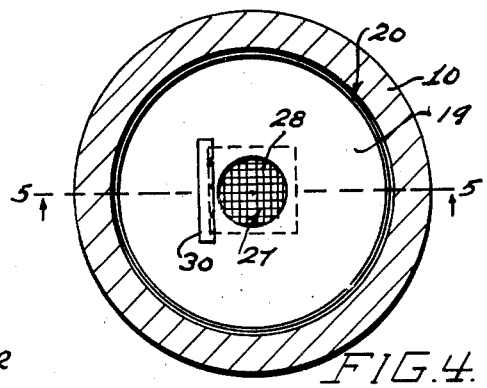
FIGURE 4 is a cross section section seen on a line 4—4 of FIGURE 1 looking in the direction of the arrows.
Figure 5:
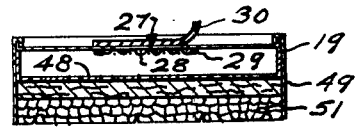
FIGURE 5 is a sectional view seen on a line 5—5 of FIGURE 4 looking in the direction of the arrows.
Figure 2:
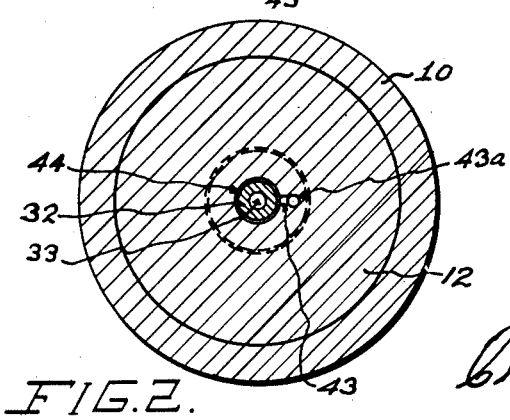
FIGURE 2 is a cross section view seen on the line 2—2 of FIGURE 1 looking in the direction of the arrows.

The renewable cartridge, as shown more particularly in FIGURES 3 and 4 is provided at the top with an outlet opening 27. Immediately under opening 27 a screen 28 is soldered as at 29. When a desiccant can is kept in stock the opening 27 is covered with a vapor-proof cover 30 which is suitably adhered. This cover is shown in FIGURE 4 as undergoing removal preparatory to putting the desiccant cartridge into use. While in the drawing the screen 28 is shown as relatively coarse for purposes of illustration, it is preferably very fine providing only openings of ten micron major diameter or less.

At the lower end the desiccant cartridge is provided with a second port 31 and a plunger 32 projecting downwardly thru said port. The plunger is tubular and provides a thru bore 33 serving as an inlet passage to the interior 34 of the desiccant cartridge. This plunger is held in place by an integral shoulder 35, disposed in space 34, and a nut 36 screw threaded on the plunger as at 37 and tightened against a gasket 38. The desiccant cartridge, which is preferably of light-weight tin can construction, normally rests on the lower closure 12 which is relieved as at 39 to accommodate the nut 36.

The lower closure 12 is provided with a thru bore 40 which is suitably finished to receive, and to form a sealing contact with, the plunger. In the embodiment shown it is assumed that the plunger 32 clears the bore 40 by as little as one or two thousandths of an inch while the real seal is effected by a pair of spaced O-rings 41 and 42 conventionally mounted on the plunger.

The bore 40 of the closure 17 is provided with a vent port 43 which is continued as at 43a to vent to the atmosphere. The plunger is shown as provided with an annular relief groove 44 between O-rings 41 and 42 and registering with the vent port 43.

Bore 40 at its lower end, is threaded at 45 to receive suitable plumbing (not shown) to convey air or other gas to be purified into the desiccant cartridge, usually under considerable pressure. Likewise outlet port 21 is also threaded at 46 to receive suitable plumbing (not shown) to convey the desiccated and purified air or gas away from the pressure chamber 20 of cylinder 10.

The desiccant cartridge is otherwise of conventional construction being provided interiorly with perforated spacers 47 and 48, one adjacent each end of chamber 34 and filter pads 49 and 50, one adjacent each perforated spacer. The volume of chamber 34 between the two filter pads is filled with the desiccant indicated by the numeral 51.

In operation gas enters the bore 40 of closure 12, passes through the bore 33 of plunger 32 into the chamber 34 from whence it passes thru the lower perforated spacer 47 and then thru the lower filter pad 50. This gas rises slowly thru the bed of the desiccator and then passes thru the upper filter pad 49 and the upper perforated separator 48 to pass out thru filter 28 and into the pressure chamber 20.

Thus, while compressed gas is passing thru this desiccator the pressure chamber is under pressure and the desiccant cartridge has substantially equal pressure internally and externally. The upper sealing ring 42 is subject to the pressure in chamber 20 while the lower ring 41 is subject to the pressure of incoming gas; the only difference between the respective pressures being equal to the resistance to flow offered mainly by the desiccant.

In keeping with a salient feature of the invention, there is only atmospheric pressure in the space between the rings 41 and 42; the pressure above ring 42 therefor serving to keep it in effective sealing position while the pressure below ring 41 acts similarly on this lower ring.

Consequently all air or gas which flows from the desiccator via port 21 has been compelled to percolate slowly thru the desiccant bed and to be uniformly dehydrated and purified. Should incoming gas from bore 40 leak by the lower ring 41, it will be vented to the atmosphere via passages 43 and 43a. Again if air or gas from chamber 20 should leak by the upper ring 42, it will escape to atmosphere via passages 43 and 43a.

Any leakage thru these passages 43 and 43a is readily detected audibly or otherwise and should such leakage be manifest the cartridge can be removed and new O-rings installed.

When the complete desiccator, as shown, is plumbed to form part of a pressure system the cartridge can be removed by closing off the supply of compressed gas whereupon the top closure 11 is removed without having to loosen or detach any piping.

In any event this invention provides that no air or other gas will bypass the desiccant and in many applications a gas containing one thousand parts of contaminant per million, for example, when bypassing to the extent of only one-half of one percent, the contamination of the outcoming gas will be raised five parts per million and the purpose of the desiccator be completely defeated.

Figure 6:
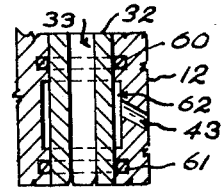
FIGURE 6 is a fragmentary vertical sectional view showing a modification of the part known as the plunger.

In FIGURE 6 I have shown a modification in which sealing rings 60 and 61 and an atmospheric vent 62 are all a part of the lower closure 12. In either form of the invention, however, it is well to have the cross sectional area of the atmospheric vent larger than the total clearance area around the plunger so that even if either or both rings were ineffective, or even if they were omitted, the leakage might be excessive but at least no impure gas from inlet port 40 could bypass the desiccant and escape via the outlet of port 21.

In the foregoing I have, for purposes of describing one practical embodiment of my invention now in successful use, been somewhat specific as to design, arrangement and function of parts, but this shall not be interpreted as limiting the scope of my invention which is of a broader nature as shown by the claims.

I claim:

1. In a desiccator, a pressure cylinder having a pressure chamber and an inlet bore leading into said pressure chamber, a desiccant container within said pressure chamber having a desiccant chamber opening at one end thereof into said pressure chamber, a tubular plunger carried by said desiccant container extended into said inlet bore and establishing communication between said inlet bore and the other end of said desiccant chamber, the inlet bore of said pressure cylinder having an atmospheric vent between the ends of said plunger and a pair of spaced sealing rings externally of said plunger and positioned so that the atmospheric vent of said inlet bore is between the spaced sealing rings.

2. In a desiccator, a pressure cylinder having an outlet port, a relatively fixed lower closure to said cylinder and a removable upper closure; all cooperating to enclose a pressure chamber, the lower closure provided with an inlet bore, a desiccant container in said pressure chamber having a top opening, a tubular plunger depending from said desiccant container fitted in said inlet bore and establishing communication between said inlet bore and the interior of said desiccant container, and a pair of spaced seals externally of said plunger in sealing contact with surfaces of said bore; said lower closure provided with a vent port intersecting said inlet bore at a point between said spaced seals.

3. In a desiccator, a pressure cylinder having an outlet port, a relatively fixed lower closure to said cylinder and a removable upper closure, all cooperating to enclose a pressure chamber, the lower closure provided with an inlet bore, a desiccant container in said pressure chamber having a top opening, a tubular plunger depending from said desiccant container and fitted in said inlet bore and establishing communication between said inlet bore and the interior of said desiccant container, a pair of spaced seals externally of said plunger in sealing contact with surfaces of said bore; said lower closure provided with a vent passage intersecting said inlet bore between said sealing rings and leading to the atmosphere.

References Cited in the file of this patent

UNITED STATES PATENTS

| | | |
|---|---|---|
| 317,794 | Jackson | May 12, 1885 |
| 319,364 | Westinghouse | June 2, 1885 |
| 2,728,407 | Squier | Dec. 27, 1955 |
| 2,970,470 | Kenneday | Feb. 7, 1961 |
| 3,008,540 | Gibson | Nov. 14, 1961 |
| 3,029,581 | Robbins | Apr. 17, 1962 |